J. J. VERCKLER.
Pump-Operating Mechanism.
No. 218,694. Patented Aug. 19, 1879.
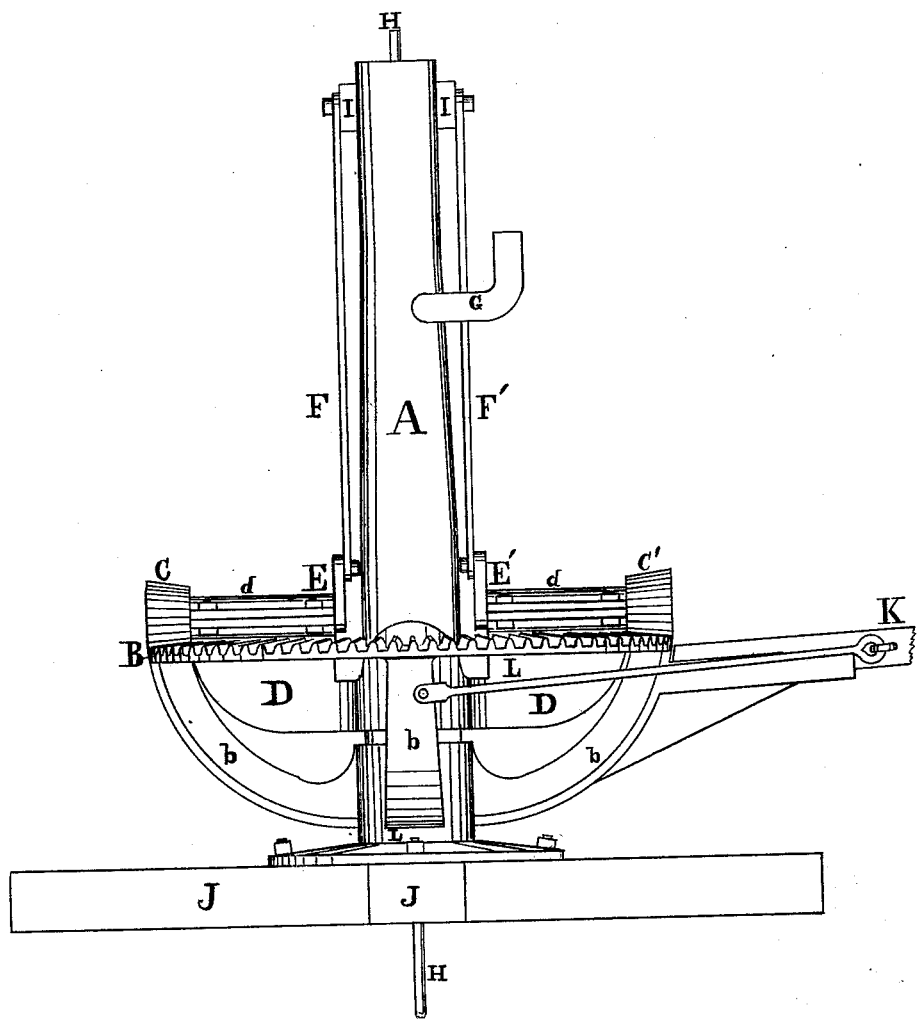

UNITED STATES PATENT OFFICE.

JOSEPH J. VERCKLER, OF SAN LEANDRO, CALIFORNIA, ASSIGNOR OF ONE-HALF HIS RIGHT TO FREDERICK W. WHEELER, OF SAME PLACE.

IMPROVEMENT IN PUMP-OPERATING MECHANISMS.

Specification forming part of Letters Patent No. 218,694, dated August 19, 1879; application filed February 19, 1879.

*To all whom it may concern:*

Be it known that I, JOSEPH J. VERCKLER, of San Leandro, in the county of Alameda and State of California, have invented a new and useful Improvement in Pump-Operating Mechanisms, of which the following is a specification.

The invention relates to pump-operating mechanism used for pumping water.

The object of my invention is to make such machines in a more simple and compact manner than heretofore and at reduced cost.

The invention consists in combining a horse-power and pump in the manner shown.

The accompanying drawing is an elevation of a horse-power and pump embodying my invention.

A represents a pump firmly bolted to a wooden platform, J, made in the form of a cross, so that it may be placed over the mouth of a well or cistern.

B represents a horizontal bevel-wheel, having arms $b\ b\ b$, curved as shown, and converging to a sleeve or hub, L, that revolves, when the machine is in operation, on the pump A.

C C' are pinions, whose teeth engage with those of the bevel-wheel B.

D is the lower portion of a double journal-box rigidly fastened to the pump.

$d\ d$ are the upper portions or caps of the journal-boxes.

E E are cranks, which are rigidly connected with the cranks C C' by shafts running in the double box D.

F F' are pitmen connecting the cranks E E' with the piston-rod H by means of the cross-head I. The cross-head I moves up and down in slotted openings provided for it in the sides of the pump A.

G is the discharge-spout.

K is a part of a sweep or lever to which a horse is to be attached.

The operation of my horse-power is as follows: Motion being given to the bevel-wheel by a horse through the medium of the lever K, the pinions C C' are caused to revolve, carrying the cranks E E' with them, thus giving reciprocating motion to the piston-rod through the medium of the pitmen F F' and the cross-head I.

The bevel-wheel B may be inverted and the pinions, cranks, pitmen, and cross-head may all be placed below it, when that arrangement is desirable.

Having thus described my invention, what I claim, and desire to secure by Letters Patent, is—

The bevel-wheel B, the pinions C C', cranks E E', pitmen F F', cross-head I, and pump A, arranged, operating, and combined substantially as shown, for the purpose set forth.

JOSEPH J. VERCKLER.

Witnesses:
 WM. S. DU BOIS,
 JACOB PRICE.